United States Patent
Sinha et al.

(10) Patent No.: US 10,831,954 B1
(45) Date of Patent: Nov. 10, 2020

(54) TECHNOLOGY LOOKUP TABLE-BASED DEFAULT ASSERTION GENERATION AND CONSUMPTION FOR TIMING CLOSURE OF VLSI DESIGNS

(71) Applicant: International Business Machines Corporation, Armonk, NY (US)

(72) Inventors: Debjit Sinha, Wappingers Falls, NY (US); Ravi Chander Ledalla, Fishkill, NY (US); Chaobo Li, Wappingers Falls, NY (US); Adil Bhanji, Wappingers Falls, NY (US); Gregory Schaeffer, Poughkeepsie, NY (US); Michael Hemsley Wood, Wilmington, DE (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/667,880

(22) Filed: Oct. 29, 2019

(51) Int. Cl.
*G06F 17/50* (2006.01)
*G06F 30/30* (2020.01)
(Continued)

(52) U.S. Cl.
CPC .......... *G06F 30/30* (2020.01); *G06F 30/3312* (2020.01); *G06F 30/3323* (2020.01);
(Continued)

(58) Field of Classification Search
CPC .... G06F 30/30; G06F 30/3312; G06F 30/398; G06F 30/3323; G06F 30/337; G06F 30/373
(Continued)

(56) References Cited

U.S. PATENT DOCUMENTS

| | | | | |
|---|---|---|---|---|
| 4,093,823 A | * | 6/1978 | Chu | G06F 13/385 |
| | | | | 370/535 |
| 6,253,195 B1 | * | 6/2001 | Hudis | G06F 16/24568 |
| | | | | 707/713 |

(Continued)

FOREIGN PATENT DOCUMENTS

EP  0827097 A2  4/1998

OTHER PUBLICATIONS

Chen et al., "MP-trees: A Packing-Based Macro Placement Algorithm for Mixed-Size Designs", DAC, Jun. 4-8, 2007, pp. 447-452. (Year: 2007).*

(Continued)

*Primary Examiner* — Phallaka Kik
(74) *Attorney, Agent, or Firm* — Erik Johnson; Otterstedt, Wallace & Kammer, LLP

(57) ABSTRACT

Efficiency of electronic design automation is increased by accessing a data structure characterizing a hierarchical integrated circuit design including sub-blocks each with a plurality of ports. For each given one of the ports of each of the sub-blocks, obtain a wire specification for a corresponding net connected to the given one of the ports in the design, and based on the wire specification, consult a technology-specific lookup table to determine at least one of a corresponding default driving cell and default electrical model for an external wire coupling one of the default driving cell and an actual driving cell to the given one of the ports. Optimize each of the sub-blocks out-of-context based on the at least one of default driving cells and default electrical models; verify in-context closure for the optimized sub-blocks; and, responsive to the in-context closure, update the data structure to reflect the optimized sub-blocks.

20 Claims, 11 Drawing Sheets

(51) Int. Cl.
   *G06F 30/398* (2020.01)
   *G06F 30/3312* (2020.01)
   *G06F 30/3323* (2020.01)
   *G06F 30/373* (2020.01)
   *G06F 30/337* (2020.01)

(52) U.S. Cl.
   CPC .......... *G06F 30/398* (2020.01); *G06F 30/337* (2020.01); *G06F 30/373* (2020.01)

(58) Field of Classification Search
   USPC ........ 716/111, 113, 106, 108, 114, 132, 134, 716/136, 103; 703/16
   See application file for complete search history.

(56) References Cited

U.S. PATENT DOCUMENTS

| | | | |
|---|---|---|---|
| 6,523,156 B2 | 2/2003 | Cirit | |
| 6,845,494 B2 | 1/2005 | Burks et al. | |
| 7,356,451 B2 | 4/2008 | Moon et al. | |
| 8,239,798 B1 | 8/2012 | Goyal et al. | |
| 8,307,317 B2 | 11/2012 | Adams et al. | |
| 8,839,166 B1* | 9/2014 | Chakraborty | G06F 30/327 716/106 |
| 9,607,124 B2 | 3/2017 | Bhanji et al. | |
| 2006/0052962 A1* | 3/2006 | Shipton | H04N 1/405 702/106 |
| 2007/0091790 A1* | 4/2007 | Passey | G06F 11/1662 370/217 |
| 2008/0307374 A1 | 12/2008 | Gregerson et al. | |

OTHER PUBLICATIONS

Guthaus et al., Gate Sizing Using Incremental Parameterized Statistical Timing Analysis, ICCAD—2005, IEEE/ACM International Conference on Computer-Aided Design, 2005, IEEE, 2005, 8 pages http://citeseerx.ist.psu.edu/viewdoc/download?doi=10.1.1.895.2927&rep=rep1&type=pdf.

Slew rate—Wikipedia, pp. 1-3, downloaded Oct. 6, 2019 https://en.wikipedia.org/wiki/Slew_rate , 3 pages.

Cadence, Tempus Timing Signoff Solution, © 2018 Cadence Design Systems, Inc. pp. 1-3.

Synopsys, PrimeTime Golden Timing Signoff Solution and Environment, © 2017 Synopsys, Inc pp. 1-7.

* cited by examiner

TECHNOLOGY LOOKUP TABLE-BASED DEFAULT ASSERTION GENERATION AND CONSUMPTION FOR TIMING CLOSURE OF VLSI DESIGNS

BACKGROUND

The present invention relates to the electrical, electronic, and computer arts, and more specifically, to semiconductor Electronic Design Automation (EDA) and the like.

EDA involves the use of software tools for designing electronic systems such as integrated circuits (ICs) and printed circuit boards. One aspect of design is timing: generally, ICs have data signals and clocks; the data signal needs to reach a certain node at the correct time vis-a-vis the time when the corresponding clock cycles the device at that node. If the data signal does not arrive in time, the clock is too fast, or alternatively, the data signal is taking too long to propagate (path is too slow). Timing closure of design refers to making design changes (optimization) to ensure all timing requirements are satisfied to meet the desired chip design operational frequency (for example, 1 GHz).

Another aspect of design is placement: based on a logical description, each component is placed, looking to minimize congestion in each area of the design. In modern very large scale integration (VLSI) designs, large parts of the design must typically be placed and optimized in a hierarchical manner. Hierarchical design and timing closure is thus a pertinent issue for large chip designs such as multi-core chips, multi-unit cores, multi-macro units, and the like.

SUMMARY

Principles of the invention provide techniques for technology lookup table-based default assertion generation and consumption for timing closure of VLSI designs. In one aspect, an exemplary method for increasing the efficiency of electronic design automation includes accessing a data structure including data characterizing a hierarchical integrated circuit design including a plurality of sub-blocks each with a plurality of ports; and, for each given one of the ports of each of the sub-blocks: obtaining a wire specification for a corresponding net connected to the given one of the ports in the design; and based on the wire specification, consulting a technology-specific lookup table to determine at least one of a corresponding default driving cell and default electrical model for an external wire coupling one of the default driving cell and an actual driving cell to the given one of the ports. Further steps include optimizing each of the sub-blocks out-of-context based on the at least one of default driving cells and default electrical models; verifying in-context closure for the optimized sub-blocks; and, responsive to the in-context closure, updating the data structure to reflect the optimized sub-blocks.

In another aspect, an exemplary computer includes a memory; and at least one processor, coupled to the memory, and operative to increase the efficiency of electronic design automation by carrying out any one, some, or all of the method steps from the preceding paragraph.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

enhanced chip-design optimization for integrated circuits and reduced iterations of across hierarchy design optimization leading to faster time-to-market for the chip;

can be used early-on in optimization process before parent levels of hierarchy of design is close to being finalized;

can address across-hierarchy design and/or clock-domain mismatch;

less disk usage than prior art techniques.

These and other features and advantages of the present invention will become apparent from the following detailed description of illustrative embodiments thereof, which is to be read in connection with the accompanying drawings.

DETAILED DESCRIPTION

Figure 1:
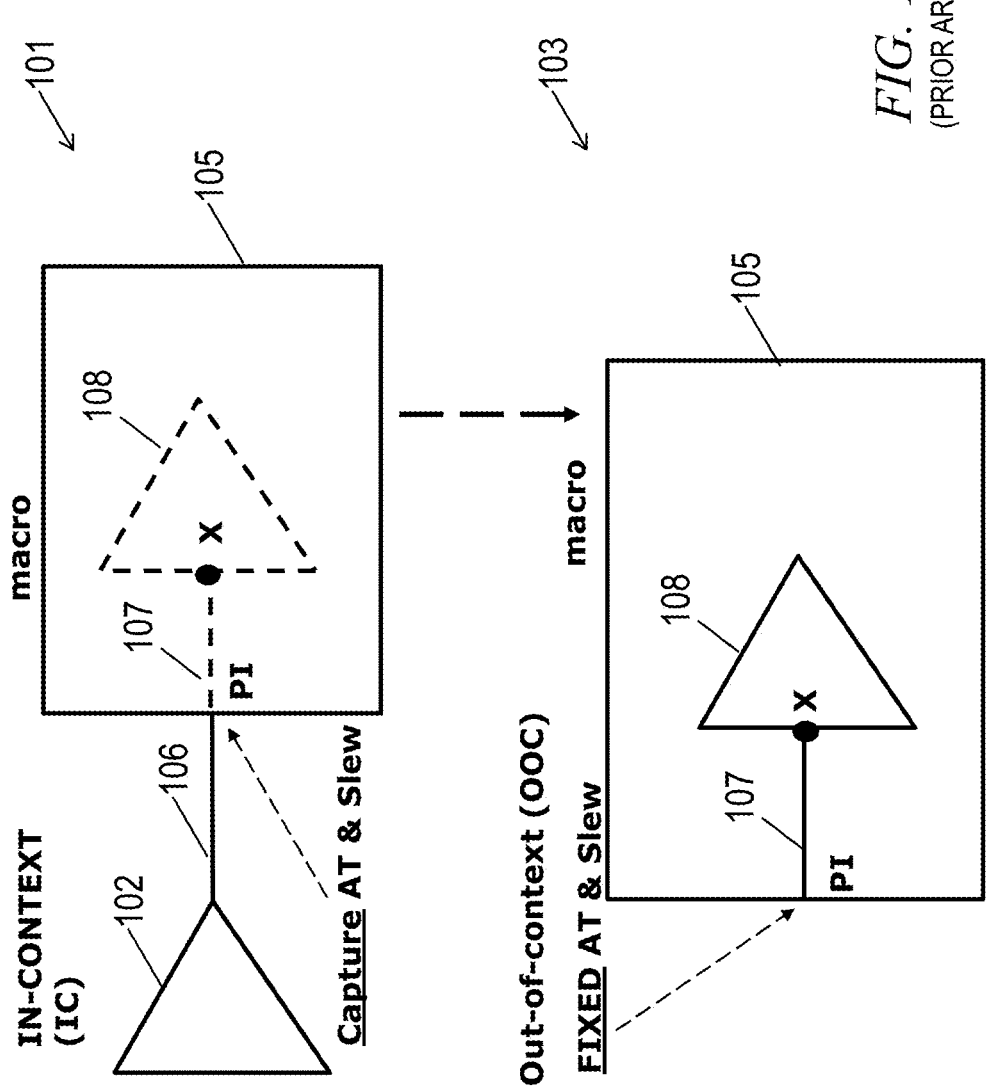
FIG. 1 shows hierarchical timing wherein sub-block timing is closed in isolation with fixed in-context assertion generation, according to the prior art.

One or more embodiments advantageously provide techniques of technology lookup table-based default assertion generation and consumption for timing closure of VLSI designs. Modern complex VLSI chip designs are architected in a hierarchical fashion, wherein the top level design is partitioned into sub-blocks. Each sub-block may be further partitioned into smaller sub-blocks. In general, a chip may contain multiple sub-blocks termed cores. Cores may be partitioned into sub-blocks termed units, and units may be partitioned into smaller sub-blocks termed macros. This hierarchical design approach facilitates parallel chip design across multiple design teams. Timing closure for such designs is also performed in a hierarchical fashion. In hierarchical timing, each sub-block, for example, a macro, is timing closed (or optimized) in isolation without being connected to its parent level of hierarchy. This state of any sub-block is termed the out-of-context (OOC) state. The timing closed sub-block may optionally be macro-modeled, and the macro-model of that sub-block is used during timing closure at the parent level of the hierarchy. The sub-block (or its macro-model) at the parent level of the hierarchy is considered to be in the in-context (IC) state. As noted, hierarchical design and timing closure are pertinent for large chip designs such as multi-core chips, multi-unit cores, multi-macro units, and the like. In some instances, referring to view 103 in FIG. 1, sub-block (e.g. macro 105) timing is closed in isolation (out-of-context/OOC). Without any loss of generality, the term "macro" in the rest of this document is illustrative of any sub-block (core, unit, macro) which is optimized at its OOC state and then used at the parent IC state. Port assertions (input arrival time, slew, output required-arrival-time, etc.) for any macro OOC timing are obtained from parent level (in-context/IC) assertion generation in view 101.

As used herein, "slew rate" refers to a signal transition time which is defined as the unit of time it takes an electrical signal to transition between two given voltage values (typically between 10% and 90% of the maximum voltage). Electronic circuits may specify minimum or maximum limits on the slew rates for their inputs or outputs, with these limits only valid under some set of given conditions (e.g. output loading). When given for the output of a circuit, such as an amplifier, the slew rate specification guarantees that the speed of the output signal transition will be at least the given minimum, or at most the given maximum. When applied to the input of a circuit, it instead indicates that the external driving circuitry needs to meet those limits in order to guarantee the correct operation of the receiving device. If these limits are violated, some error(s) might occur and correct operation is no longer guaranteed.

The accuracy of input and output port assertions during OOC timing closure of a macro strongly impacts the quality of optimized macro design. The default prior art approach of obtaining port assertions involves capturing the timing at macro boundary crossings from the IC timing run, and using them as fixed assertions for OOC timing. There are limitations with this approach; for example, OOC input port (primary input or "PI") path optimization assuming fixed port assertion may be inaccurate. The captured timing information which is used as a fixed assertion is valid and accurate only when the macro 105 is being driven by a certain kind of device 102 via external and internal wires 106 and 107, respectively, having certain resistive and capacitive (RC) properties and finally feeding a certain kind of receiver device 108 having certain input capacitance properties. Suppose, for given conditions, the signal arrives at the macro input PI via 106 at 50 picoseconds (ps), which is captured as a fixed number in-context. When the design of 105 is optimized OOC, the RC properties of 107 may change. Receiver gate 108 properties may change as well during optimization (for example, device re-sizing). In general, if the new RC properties of the internal wire 107 and device 108 are substituted back into the in-context calculations, the arrival time will no longer be 50 ps. Thus, fixed assertions are useful when macros are not to be optimized OOC; however, when a macro is optimized OOC, the changes may well result in the fixed IC values no longer being valid—OOC optimization impacts what happens IC. Indeed, in some instances, a false OOC timing closure shows slew violation failures in-context.

Regarding true sink (pin X in FIG. 1) SLEW accuracy and true sink arrival time (AT) accuracy for OOC boundary-path optimization with fixed assertions, according to the prior art, we have found that in some cases, in excess of 50% slew errors may be observed in the worst case, with a standard deviation of error in slew of about 18%, and in arrival time (AT) of about 8%.

Figure 2:
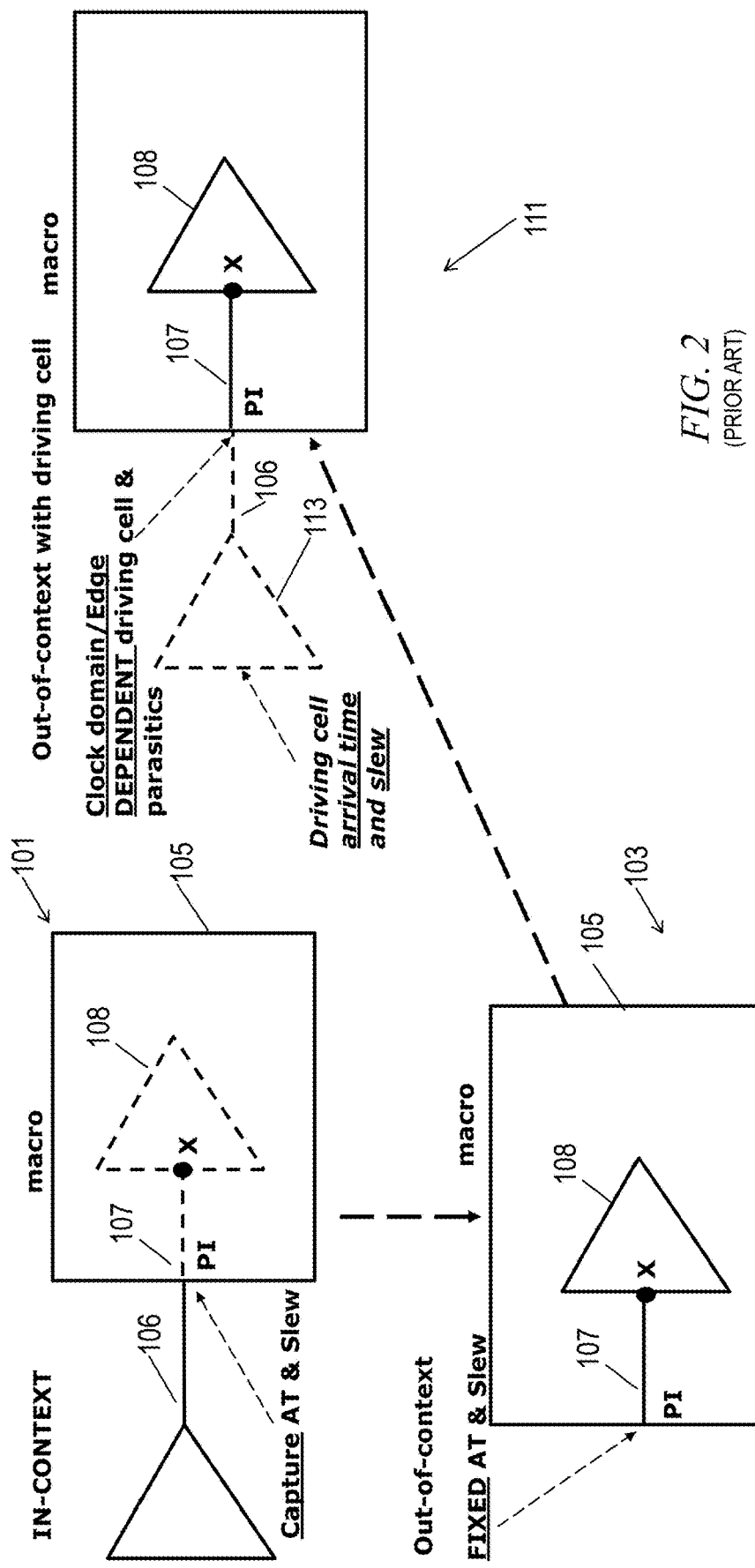
FIG. 2 shows a prior-art driving cell concept.

View 111 in FIG. 2 shows a driving cell concept in accordance with the prior art; note driving cell 113. The approach of FIG. 2 uses additional information, from the exact, in-context environment, as part of the assertions. Instead of merely applying the assertion at PI, this approach captures the in-context gate that was driving the input PI via external wire 106; i.e., the driving cell 113. Instead of capturing the signal arrival at PI, the approach captures arrival at the input of the driving cell 113. This permits mimicking the IC environment for the OOC calculations. This addresses the problem of changes in the RC characteristics of 107 and/or 108 impacting how the driving gate sees the load. Replicating the in-context gate and wire 113 and 106 results in retaining accuracy at the OOC level even when optimization is undertaken. In the OOC calculations, the assertions are now applied to the input of the driving cell 113 rather than to PI. Three pertinent aspects in the prior art include driving cell on a given port PI (per clock-domain, mode (e.g., min or max timing), edge (e.g., rising or falling transition dependent)); corresponding external wire RC parasitics (which are also clock-domain, mode, edge dependent); and driving cell source arrival time and slew (instead of those at the input port PI). Regarding the terminology "clock-domain," there can be multiple clocks (e.g. fast clock, slow clock, functional clock, scan clock and the like) propagating through the same design and in different cases the gates and wires for the different clocks may be different and/or have different assertions, and the captured input signal may also be different. This occurs due to the fact that multiple macro instances may be present in the parent level hierarchy (in-context), each instance being driven by a different driving gate and external wire, and different instances applying to different clock domains.

Regarding true sink (pin X in FIG. 2) SLEW accuracy and true sink AT accuracy for prior-art OOC boundary-path optimization with clock-domain/edge/exact driving cell assertions (as in view 111 of FIG. 2), we have found that essentially "perfect" accuracy is achieved in most cases, even when optimization is carried out OOC at the macro level.

Prior art techniques typically require a "good" in-context state of the design to obtain meaningful driving cell/wire assertions to be used in OOC timing closure, which limits their use in early optimization (indeed, prior-art use of un-optimized long external wires from an IC run may negatively impact OOC optimization). Furthermore, prior art techniques are typically not flexible with IC and OOC design/clock-domain mismatch (e.g., new pin/clock-domain in OOC), such that the designer is left with a mix of driving cell assertions and fixed assertions with overrides. Furthermore in this regard, manual assertion is typically prohibitive due to complex RC (resistor and capacitor) specification, driving cell arrival-time/slew calculations, etc. Yet further, in current techniques, high disk usage is noted for external wire RC parasitic file generation. For example, assuming one hundred twenty five sub-blocks at the parent level and two clock domains, on the average, per PI, and considering all combinations of min/max timing (two modes, slowest and fastest) and rising/falling edges (two edges) implies approximately one thousand RC parasitic files, which could take multiple giga-bytes on disk. In general, prior art techniques typically require capturing a driving cell and a wire across all the clock domains across the different modes and different edges. Capturing the RC information for the external wires is typically very memory intensive in prior art techniques.

Figure 3:
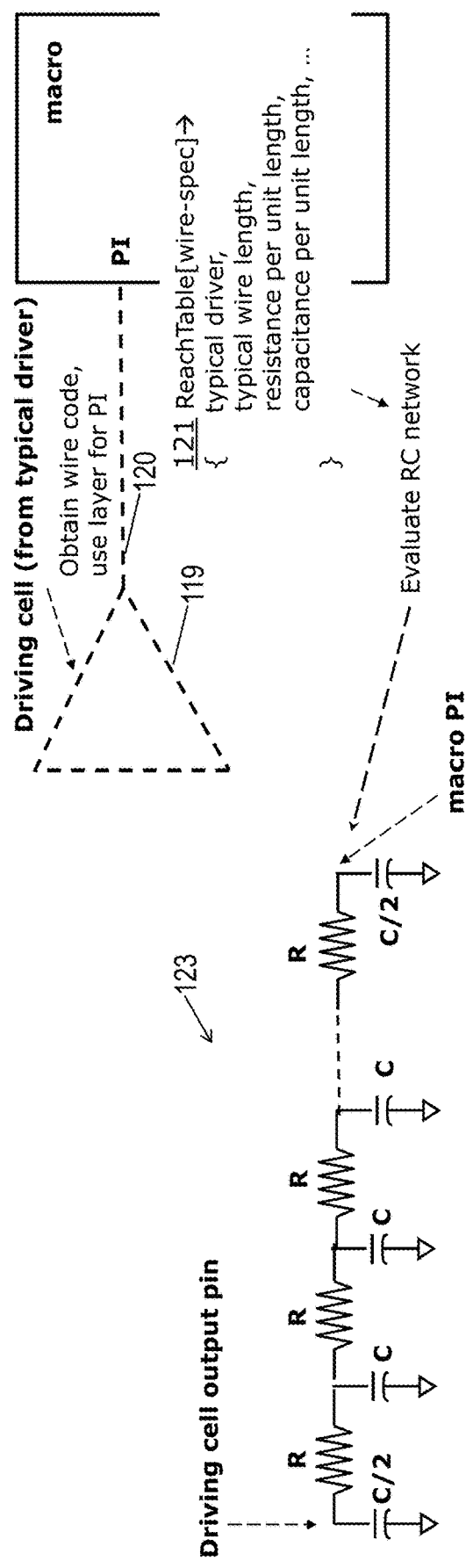
FIG. 3 shows a default driving cell and wire concept, according to an aspect of the invention.

Referring to FIG. 3, one or more embodiments overcome, one, some, or all of the deficiencies in the prior art by dynamically creating a default driving cell 119 and external wire 120 for a given port of a sub-block based on the wire specification (specification can include, for example, wire layer (e.g. wiring layer 2, wiring layer 4, . . . ) and wire code (e.g., thick, thin, . . . )) for the net connected to the port, using technology lookup table-based inputs. For example, obtain same from the IC external wire, or the OOC internal wire, or the port use layer, or user overrides. In one or more embodiments, a technology-specific pre-characterized lookup table (also known as reach table 121) provides mapping from wire specification to the {typical driver, typical wire length, and per unit length parasitics (resistance, capacitance, etc.)}. One or more embodiments use data from the reach table to generate default driving cell and electrical models for the external wire. Given wire resistance (dR/dL) and capacitance (dC/dL) per unit length, and a typical wire length (L), in one embodiment, a distributed RC model is generated for a wire with total resistance (L*dR/dL) and total capacitance (L*dC/dL). In this model, a wire is considered as a series connection of N small segments 123, where the resistance of each small segment is $$R = \frac{L * dR/dL}{N},$$

and me capacitance of each segment is $$C = \frac{L * dC/dL}{N}.$$

In some instances, a sub-set of these may be user overridden and/or N (the number of RC sub-segments) generally depicted at 123 may be user-specified. Thus, in one or more embodiments, rather than using the exact driving cell 113 and exact external wire 106, representative defaults are determined for both the driving cell and the external wire, by consulting a technology-specific pre-characterized lookup table 121 or so-called "reach" table. Given a specific type of wire, the lookup table will include, for example, resistance per unit length, capacitance per unit length, and even a typical driver and typical length for wires of this type. For a given technology (e.g. 7 nm, 14 nm, and so on), a lookup table can be generated once and used across different designs in the same technology node. Use of representative defaults for the driving cell (gate) and external wire advantageously overcomes the prior art deficiency of excess disk usage and permits usage early-on in the optimization process.

A variety of techniques can be used to populate the reach table 121. To determine the typical driver for a given wire specification, an integer can be assigned to each type of driver of that wire specification in a body of historical data, and the statistical mode can be calculated. The type of driver corresponding to the mode can be selected as the typical driver. To determine the typical wire length, resistance per unit length, and capacitance per unit length for a given wire specification, for a body of historical data, statistical mean can be calculated for each of these parameters. The mean can be selected as the typical wire length, resistance per unit length, and capacitance per unit length for a given wire specification. In another technique, electrical simulations with different combinations of driver gates and wire RC parasitics may be performed for each wire specification to determine representative gates and wire parasitics that have acceptable timing delay and slew degradation. Given the teachings herein, the skilled artisan will be able to populate a reach table (technology-specific lookup table) 121.

Further consider the technology-specific lookup table (a/k/a reach table). As will be appreciated by the person skilled in the field of EDA, a reach table can be developed from a library of layer traits provided by the designer, and can include, for example, for each layer, an appropriate layer trait/wire trait and reach length R (how far the signal can travel in a single cycle). In one or more embodiments, IC assertion generation captures wire-specification of the external wire (connected to a sub-block's port) instead of the traditional driving cell/wire for default driving cell generation during OOC timing. Wire specification is captured, for example, in a clock-domain/edge/mode-dependent or -independent fashion. In one or more embodiments, the actual driver is captured from the IC environment with a wire specification for only default wire RC generation. In case of multiple instances of sub-block(s) at the parent level, one or more embodiments use some combination of slew, slack and arrival time to choose wire specification from one instance (e.g., for a given input port of the sub-block, the wire specification of the external wire feeding the instance which has the smallest slack is chosen). In one or more embodiments, simulation and characterization are carried out up front for each different technology node to determine, for different types of wires, for certain wire attributes such as wire use layer and wire code, (i) what type of gate/cell typically feeds such a wire, (ii) what is the typical resistance per unit length, (iii) what is the typical capacitance per unit length, and (iv) what is the typical length of the wire, and so on. The pre-populated table is then used to determine the default driving cell and default external wire. It is also possible to have in the table a default row that maps to multiple kinds of wires.

Figure 4:
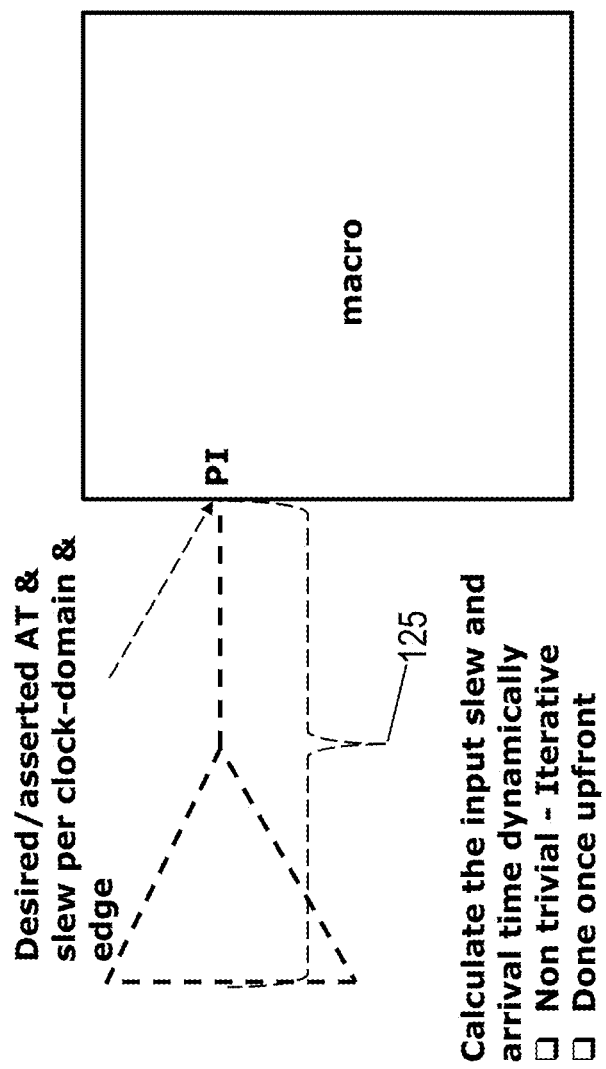
FIG. 4 shows dynamic driving cell delay and input slew calculation, according to an aspect of the invention.

FIG. 4 shows aspects of dynamic driving cell delay and input slew calculation. One or more embodiments reverse compute the slew (voltage waveform) and the arrival time (AT) at the input of the driving cell that yields the same sub-block's desired port arrival time and slew. In one or more instances, an iterative approach is employed to (1) compute the driving cell source slew that produces the desired port (or true sink) slew; (2) compute the delay through the driving cell and external wire using the computed slew; and (3) compute the arrival time at the driving cell source by shifting the desired port arrival time by the computed delay. This can be repeated for each clock-domain/mode/edge. Furthermore in this regard, the expected signal (arrival time and slew per clock-domain and edge) at the PI pin is known from the initial timing contracts at commencement of the hierarchical design process (and can be refined as the design process progresses). For the given default driving cell and wire, determine the input slew and arrival time at the input to the default driving cell that produces the expected signal at PI. Dynamic driving cell delay and input slew calculation as depicted in FIG. 4 can, in general, be used with the prior art approach shown at 111 in FIG. 2 and the inventive default cell/wire approach shown in FIG. 3.

Aspects depicted in FIG. 4 can be carried out, for example, as a pre-processing step before OOC timing, or right before OOC timing optimization, or during IC assertion generation. One or more embodiments provide considerable flexibility. For example, it is possible to deal with clock-domains that are incompatible between in-context and out-of-context. New clock-domains can be introduced and/or clock-domains can be removed. In some cases, all clock-domains get the same driving cell. Some embodiments permit the slews at the PI to be changed by user using overrides. Some embodiments automatically compute the driving cell input arrival time and slew. As seen at 125 in FIG. 4, one or more embodiments calculate the input slew and arrival time dynamically. This is typically a non-trivial process requiring an iterative solution, and can advantageously be done once "upfront."

Figure 5:
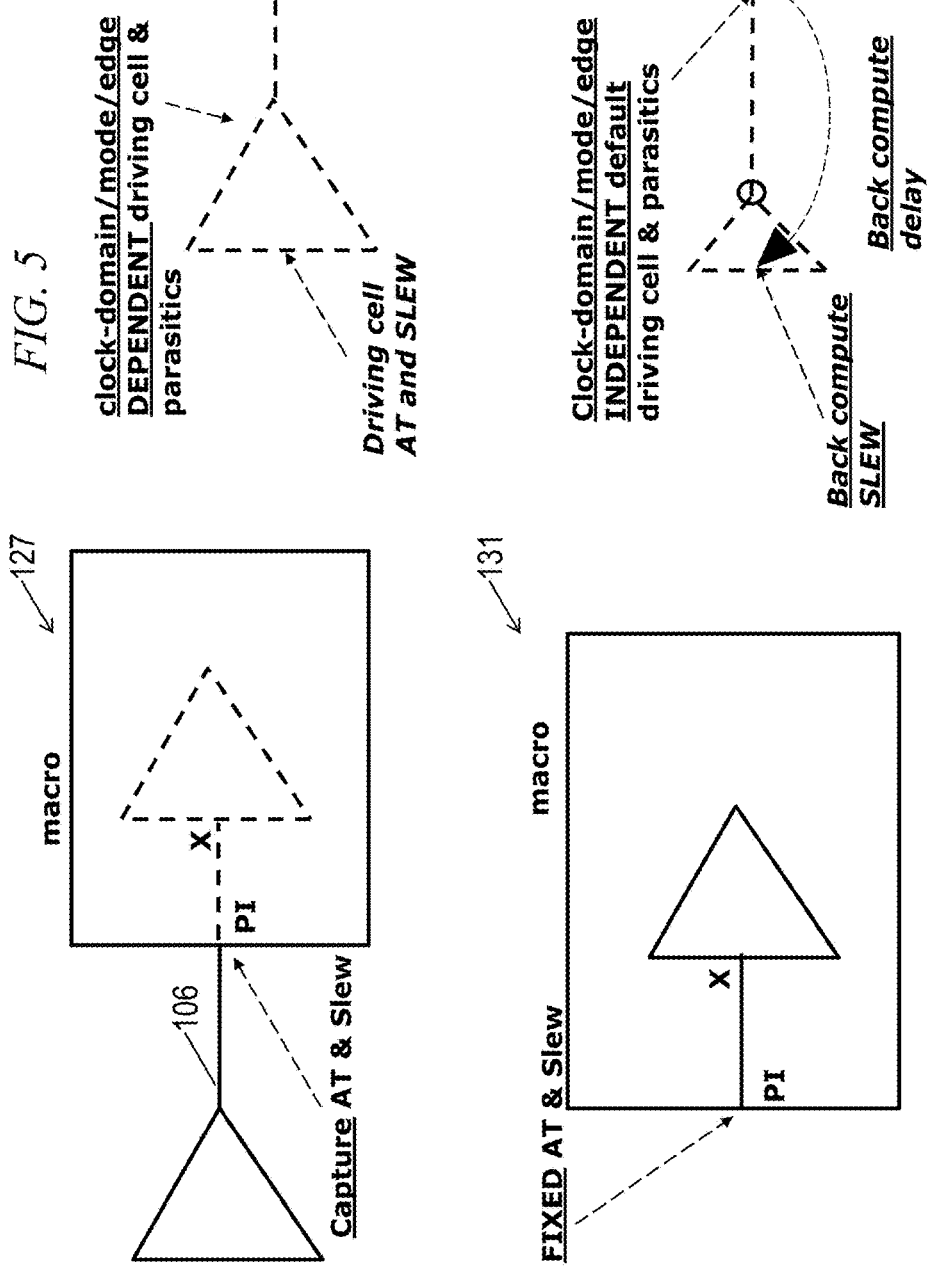
FIG. 5 compares a default driving cell concept and dynamic driving cell delay and input slew calculation, according to aspects of the invention, to prior art approaches.

FIG. 5 compares an in-context calculation 127, an OOC calculation with fixed AT and slew at 131, an OOC calculation with clock-domain/mode/edge dependent exact driving cell and parasitic, at 129, and an OOC embodiment 133, according to an aspect of the invention, wherein a clock-domain/mode/edge independent (and thus less memory-intensive) default driving cell and parasitics are employed. In the approach 127, the AT and slew are captured in-context at the PI, and then in the approach 131, the fixed AT and slew are employed OOC (compare to FIG. 1). In the approach 129, the driving cell AT and slew are determined as described at 111 in FIG. 2. In the approach 133, the in-context external wire 106 is usually not-optimized, but the timing at the boundary crossing (pin PI) may be overridden to capture the desired contract AT and slew. If the AT and slew are not acceptable (early in-context design stage), the default contract AT and slew for the port PI are used in the OOC run instead of values captured from the IC run. Subsequently, a default driver and external wire RC parasitics are determined as described in FIG. 3. The AT and slew at the source of the default driving cell is obtained as described in FIG. 4 using iterative timing reverse/back calculations.

Regarding true sink SLEW accuracy and true sink AT accuracy for OOC boundary-path optimization with default driving cell assertions, according to aspects of the invention, as at 133, only about 9% slew errors may be observed in the worst case, with a standard deviation of error in slew of about 1.7%, and in arrival time (AT) of about 0.4%. One or more embodiments thus provide better accuracy than the fixed assertion prior art approach, and while perhaps not quite as accurate as the "perfect" prior art with individualized driving cell, have other advantages such as feasibility of usage during early stages of chip design (where the IC environment is not optimized) and being much less memory-intensive since these embodiments do not require capturing multiple RC parasitic files from IC environment (savings of several to several hundreds of giga-bytes on disk).

It will be appreciated that one or more embodiments dynamically create a default driving cell and external wire specification for a given port of a sub-block based on:

(i) Wire layer and code (wire specification) for the net connected to the port (obtained from the IC external wire or OOC internal wire or user overrides);

(ii) Technology specific pre-characterized lookup table (reach table) from wire specification to typical driver, wire length, and per unit length parasitics (resistance, capacitance, etc.); and (iii) Use data from reach table to generate default driving cell and electrical model for external wire (a sub-set of these may be user overridden).

One or more embodiments reverse compute the slew (voltage waveform) and the arrival time (AT) at the input of the driving cell that yields the same sub-block's port arrival time and slew. One or more instances employ an iterative approach to compute the driving cell source slew that produces the desired port (or true sink) slew. One or more instances then further compute delay through the driving cell and external wire using the computed slew; and compute arrival time at the driving cell source by shifting the desired port arrival time by the computed delay. This process is then repeated for each clock-domain/mode/edge.

One or more embodiments also employ statistical reverse calculation for statistical timing analysis. In such cases, the reverse calculations may be performed at various samples (termed projections) of the statistical model of the slew to obtain corresponding slews at the input of the driving cell. The samples of slew at the input of the driving cell are then combined to obtain a statistical slew model. Using this statistical slew at the input of the driving cell, the statistical delay across the driving cell and external wire is computed, and then used to adjust the statistical AT on the port to obtain the statistical arrival time at the input of the driving cell.

In some cases, instead of reverse computing the driving cell input slew from the port slew and the given wire specification, for the default case, assume that the driving cell input slew is known (e.g., identical to port slew, or scaled/shifted value as a function of port slew and/or wire-code and/or use-layer), and iteratively compute and determine the needed external wire-length that yields the desired port slew when the assumed slew is asserted at the driving cell source.

Some embodiments employ a hybrid of source slew reverse calculation and default wire length calculation. In this aspect, compute the wire length for the technology specified fixed driving cell source slew that yields the nominal port slew, freeze the wire length, and re-compute the statistical driving cell source slew that yields the statistical port slew. The hybrid approach may be performed across clock domains, where for one clock domain, the needed external wire-length is determined. Thereafter, the length is frozen and the reverse slew and AT calculation is performed for all other clock domains.

One or more embodiments enhance productivity in the design of server hardware and the like. For example, one or more embodiments reduce iterations between "seemingly timing closed" OOC sub-block that show a fail during IC timing and/or reduce slew-violations with driving cells (in a non-limiting example, in 14 nm timing flows; however, aspects of the invention can be employed to analyze other technology nodes as well).

One or more embodiments provide RC support, are capable of analysis per clock-domain/edge, provide default support, and/or provide reverse delay computation support. One or more embodiments make use of the driving cell concept.

In one or more embodiments, based on the existing design data in the out-of-context run, the tool derives the type of cell that will drive a specific input pin and also derives the wire connecting the output of the driving cell and this input pin. Advantageously, this will avoid capturing these assertions from an upper level parent design that uses this macro, especially when the parent level design is not complete. In one or more instances, the tool can also enable the user to specify the driving cell along with the wire specification at each input. The wire specification is taken, for example, in the form of a wire code, the layer, and optionally the length of the wire. Given the slew at the primary input, the tool uses the driving cell and wire information to estimate the slew at the input of the driving cell and also calculates the delay through the driving cell and wire. This advantageously helps with better design optimization in the out-of-context timing without the timing assertions from the upper levels of the design.

Current techniques typically have the ability to specify a DRIVING CELL at EACH primary input. One or more embodiments extend the prior art approach by also enabling the ability to specify the wire connecting the driving cell to the primary input. The wire information is taken, for example, in the form of wire code, the layer and the length of the wire. This information is then converted into resistances (Rs) and capacitances (Cs) internally by the tool. In case the driving cell is not specified, the tool infers the appropriate driving cell using the wire code and the layer information. Also, in at least some instances, this feature allows "back propagating" the slew at the primary input to the input of the driving cell.

These features advantageously provide more accurate design optimization in the "out-of-context," which can then be used at the higher level of the design hierarchy, thereby decreasing the number of design iterations between the upper and lower levels of the design hierarchy.

Some prior art techniques are capable of carrying out timing analysis when there are process variations involved. However, this prior art timing analysis still assumes the assertions at the input ports are fixed. One or more embodiments, in contrast, describe how these assertions change when the actual circuit is being optimized. For example, one or more embodiments address how the input port timing values change in the upper level design when the actual circuit is being changed (optimized) when timing it standalone. Indeed, one or more embodiments handle assertions when the design is changing (being optimized). One or more embodiments simulate the circuit as though it is being instantiated at the upper level, even though the optimization is happening standalone.

One or more embodiments advantageously solve the problem of changing timing assertion when the design is being "optimized" without actually instantiating the "changed" sub-block at the higher level. One or more embodiments develop an acceptable gate and wire at each input so that the design can be "optimized" no matter how the sub-block is used at the "upper" level. One or more embodiments provide novel techniques for timing analysis and for dealing with boundary assertions in a hierarchical design. One or more embodiments provide more accurate timing analysis in a hierarchical design model, where various pieces of the design are timed out-of-context. One or more embodiments improve the calculations in the timing analysis of out-of-context input signals. One or more instances provide a method of creating timing constraints for hierarchical sub-blocks and using the same in an out-of-context design that more accurately matches the in-context behavior, allowing for improved optimization.

One or more embodiments provide techniques which use a default driving cell and external wire model at the input ports of the design for more accurate assertions that better enable accurate timing optimization. One or more embodiments apply to non-statistical-(deterministic-) as well as statistical-static timing optimization. Advantageously, one or more embodiments are agnostic to the exact method of timing analysis and optimization, relying on the timing analysis method for reverse computing arrival times and slews at driving cell inputs.

Figure 7:
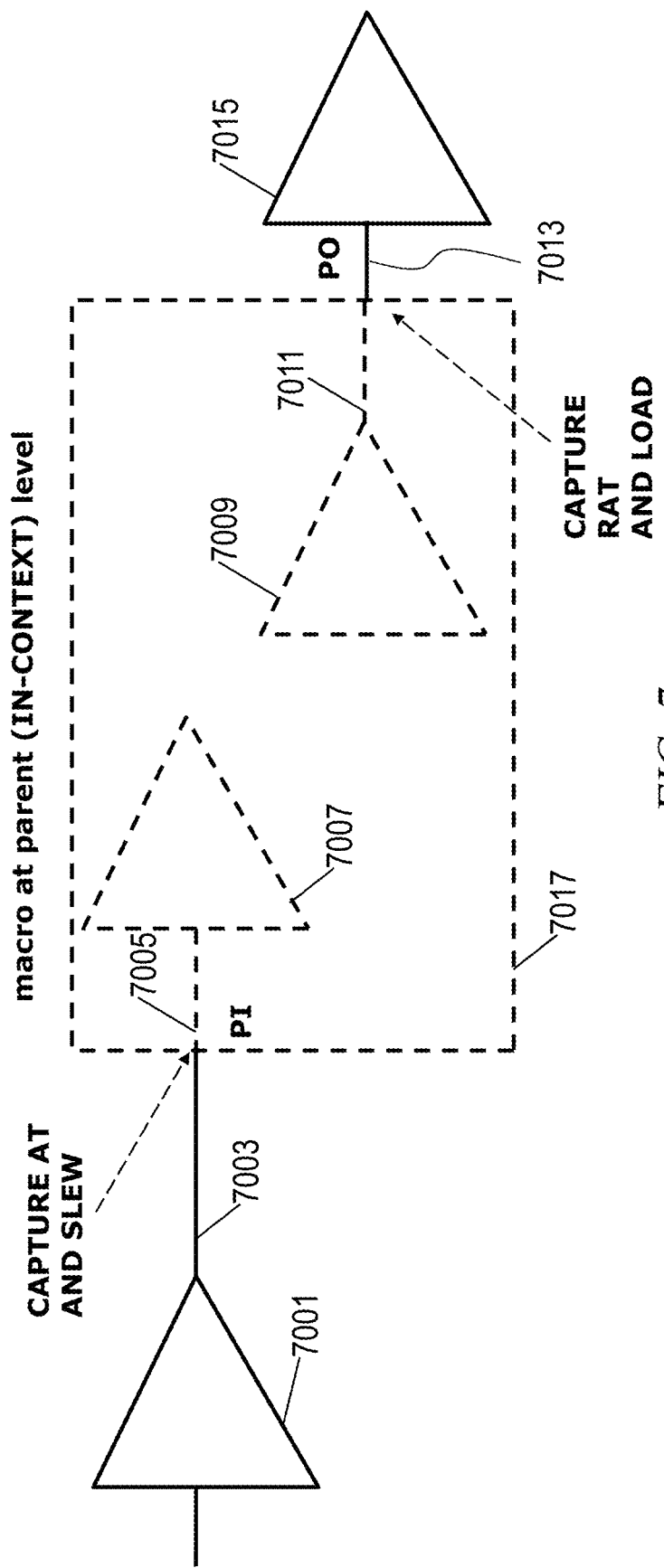
FIG. 7 shows default load assertion, according to an aspect of the invention.

Referring to FIG. 7, in addition to using a reach table to obtain assertions/default driving cells 7001/default wires 7003, 7005 to gate 7007, it is possible to apply aspects of the invention to the output side of a unit 7017, where, for an OUTPUT port PO, a typical external wire 7013 (RC network)(reached via wire 7011 from gate 7009) and typical external receiver gate 7015 can be determined. They can be captured as a wire and receiver or generalized load. This aspect further enhances accuracy of OOC calculations by improving the modeling at the output ports. This can be carried out stand-alone or together with the input-side aspects discussed above. Thus, one or more embodiments use a technology reach table that provides default driving cell and values to create a representative external wire (RC network); this can be used for input assertion. AT and slew can be captured at PI.

The same reach table can be used to generate RC wire information for an output port (primary output/PO) of the macro as well, and that can be used to capture the PO's RAT and output load assertion, instead of obtaining the load assertion from the IC run (as on the input side, advantageous because the IC design is not optimized yet). In this aspect, obtain the wire layer and code of the external wire 7013 for each primary output (PO) of a sub-block 7017 during IC timing. Then, perform a lookup in the reach table using the {layer, code} of the external wire as the input, to obtain one, some, or all of typical resistance and/or capacitance per unit length, typical wire length (reach length), the receiver pin-cap of the terminating gate 7015, and a user-specified fraction (f) of the reach length to be used.

A desired output load model can then be generated; for example, a lumped load model as a single total capacitance, a distributed N-piece RC model, or an RC model recued to a lower order model such as an RC-pi model (for example, based on source-3 moment matching of driving point admittance).

Figure 6:
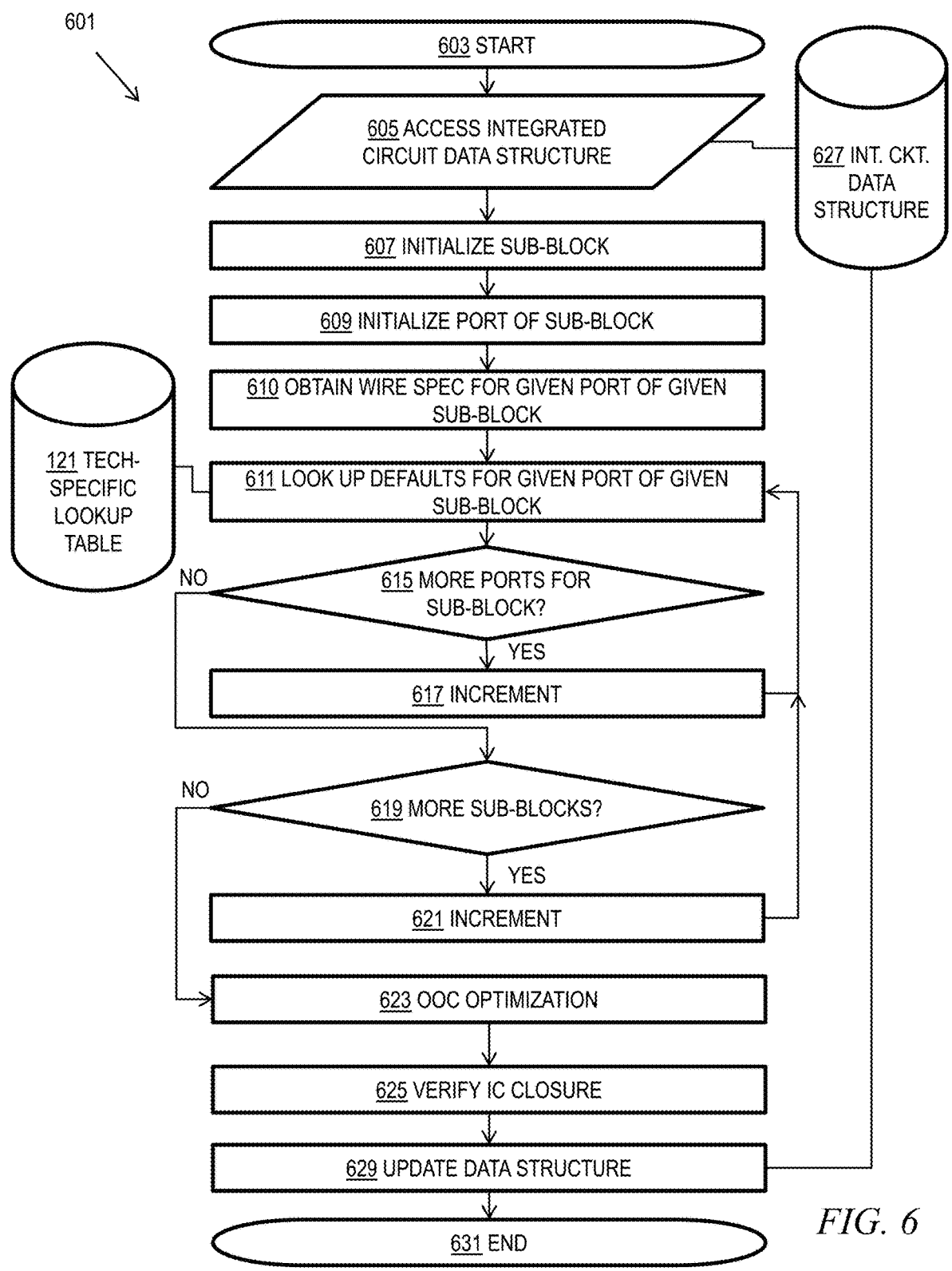
FIG. 6 is a flow chart of a default driving cell and wire method of, according to an aspect of the invention.

Given the discussion thus far, and referring to flow chart 601 of FIG. 6, which begins at 603, it will be appreciated that an exemplary method for increasing the efficiency of electronic design automation, according to an aspect of the invention, includes, at step 605, accessing a data structure 627 including data characterizing a hierarchical integrated circuit design including a plurality of sub-blocks each with a plurality of ports. A further step 610 includes, for each given one of the ports of each of the sub-blocks (see discussion of blocks/steps 615, 617, 619, 621 below), obtaining a wire specification for a corresponding net connected to the given one of the ports in the design (see 120 in FIG. 3). As noted elsewhere herein, in case of multiple instances of sub-block at the parent level, one or more embodiments use some combination of slew, slack and arrival time to choose wire specification from one instance. A further step 611 includes, based on the wire specification, consulting a technology-specific lookup table 121 to determine (i) a corresponding default driving cell AND/OR (ii) a default electrical model for an external wire coupling the default driving cell or an actual driving cell to the given one of the ports. In some instances, obtain the actual driving cell from IC and just generate a default wire. In some instances, use the actual wire but a default driving cell (for example, because the cell is a hard-block gate that is not available to the OOC design environment). In still other instances, use defaults for both; that is, in the consulting step, both the corresponding default driving cell and the default electrical model are determined, and the default electrical model is for the external wire coupling the default driving cell to the given one of the ports.

One non-limiting exemplary application is EDA-based design-optimization of a VLSI chip design, pre-manufacturing. Also, it is worth noting that additional features/limitations mentioned hereinbelow can, generally, be used where the actual driving cell is used with a default wire; where the actual wire is used with a default driving cell; or where defaults are used for both.

In one or more embodiments, to carry out steps 610 and 611 for all ports of all sub-blocks, initialize the sub-block at 607; initialize the port of the sub-block at 609; in decision block 615, check if the current sub-block has more ports. If yes, increment to the next port in step 617 and return to step 611. If no more ports for this sub-block, proceed to decision block 619 and check for additional sub-blocks. If there are more, proceed to step 621, increment to the next sub-block, and return to step 611. If no more sub-blocks, proceed to step 623.

In step 623, optimize each of the sub-blocks out-of-context based on the default driving cells and default electrical models. In step 625, verify in-context closure for the optimized sub-blocks. In step 629, responsive to the in-context closure, update the data structure 627 to reflect the optimized sub-blocks. Processing ends at 631. It is worth noting that, in the case where the in-context closure shows a violation, iterative timing can be performed across OOC and IC.

As discussed elsewhere herein, the wire specification can be captured in a clock-domain/edge/mode dependent or independent fashion. Thus, in some embodiments, the optimizing includes applying the default driving cells and default electrical models in a clock-domain, edge, and mode-independent manner, while in other embodiments, the optimizing includes applying the default driving cells and default electrical models in a clock-domain, edge, and mode-dependent manner.

Referring now to FIG. 4, one or more embodiments further include, for each given one of the ports of each of the sub-blocks, iteratively calculating a driving cell source slew that produces a desired slew at the given one of the ports PI. As discussed elsewhere herein, the expected signal (desired port arrival time and slew per clock-domain and edge) at the PI pin is known, for example, from the initial timing contracts at commencement of the hierarchical design process (and can be refined as the design process progresses). Furthermore, for each given one of the ports of each of the sub-blocks, compute a delay through the driving cell and the external wire based on the iteratively calculated driving cell source slew; and, as seen at 125, compute an arrival time at an input PI of the driving cell by shifting the desired port arrival time by the computed delay. This reverse computation can be done as a pre-processing step before OOC timing, or right before OOC timing optimization, or during IC assertion generation, for example. One or more embodiments repeat the iterative calculation for each clock-domain, mode, and edge. This reverse computation can also be done independently of the default lookup aspect, as noted elsewhere herein.

In one or more embodiments, in the accessing step 605, the sub-blocks are selected from the group consisting of cores, units, and macros.

In one or more embodiments, in the optimizing step 623, the sub-blocks are optimized out-of-context in parallel.

In one or more instances, the default electrical model for the external wire includes a plurality of resistive-capacitive (RC) sub-segments 123. In some cases, a user override is permitted for the default electrical model for a portion of the ports. Generally, the electrical model for the external wire can be user over-ridden and/or the user can specify how many RC segments.

In one or more embodiments, in the obtaining step 610, the wire specification includes wire layer and wire code. For example, wire specification is taken in the form of a wire code, the layer, and optionally the length of the wire which the tool converts to the RC network 123. Obtain the wire specification, e.g., from the IC external wire, or the 00C internal wire, or the port use layer, or user overrides.

In one or more embodiments, in the consulting step 611, the technology-specific lookup table 121 includes a plurality of entries for a plurality of tabulated wire specifications, and each of the entries includes typical driver, typical wire length, typical capacitance per unit length, and typical resistance per unit length.

In some cases, for one, some, or all of the ports of one, some, or all of the sub-blocks, assume a driving cell input slew; and iteratively calculate a needed external wire length that produces a desired slew at the given one of the ports when the assumed driving cell input slew is asserted instead of using the typical length from the reach table. In one or more embodiments, this calculated wire length is substituted for the default electrical model for the external wire coupling.

In some cases, a hybrid approach is employed: for each given one of the ports of each of the sub-blocks obtain needed external wire length as in the preceding paragraph and then freeze wire length as the needed external wire length, and re-compute a statistical driving cell source slew that yields a statistical port slew.

As discussed with respect to FIG. 7, aspects can also be used in connection with output ports. Thus, in some instances, the previously-discussed ports include input ports, and the sub-blocks of the hierarchical integrated circuit design characterized in the data structure further include output ports. Further steps then include, for each given one of the output ports of each of the sub-blocks: obtaining a wire specification for a corresponding net connected to the given one of the output ports in the design; and based, on the wire specification, consulting a technology-specific lookup table to determine at least one of a corresponding default load cell and default electrical model for an external wire coupling one of the default load cell and an actual load cell to the given one of the output ports. The optimizing of each of the sub-blocks out-of-context is further based on the at least one of default load cells and default electrical models for the external wire coupling one of the default load cell and an actual load cell to the given one of the output ports. As noted, this aspect can also be performed independently of the input side.

One or more embodiments use hierarchical design to rapidly design VLSI chips. One or more embodiments enhance accuracy of assertions and thus of hierarchical sub-block optimization (for example, multiple designers can optimize sub-blocks in parallel). In the prior art approach shown in FIG. 1, the sub-block may be optimized but it may be found that there are timing failures when looking at the sub-block in the next-higher level. One or more embodiments can be used to optimize sub-blocks; then, instantiate the overall design in a design structure, and fabricate. In one or more embodiments, resulting chips are better than prior art chips and/or the design process is faster, more accurate, and/or less computationally intensive.

Figure 9:
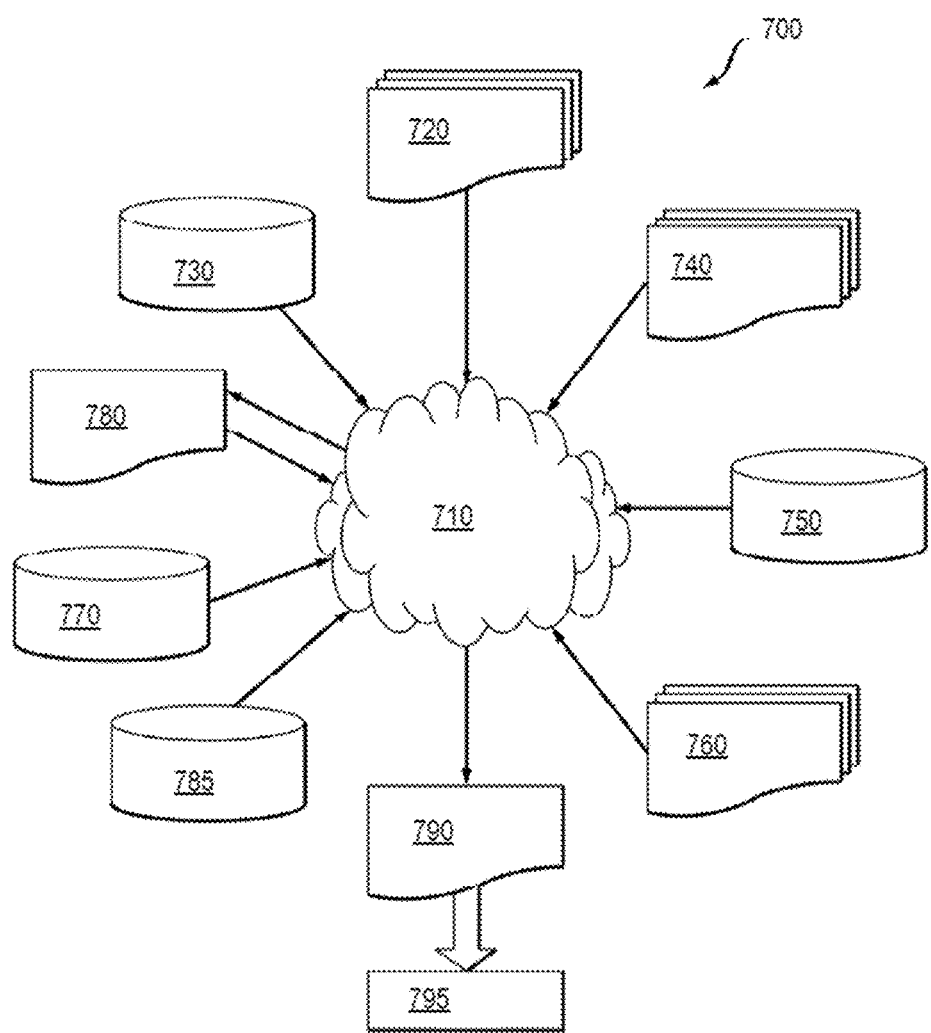
FIG. 9 is a flow diagram of a design process used in semiconductor design, manufacture, and/or test.
Figure 10:
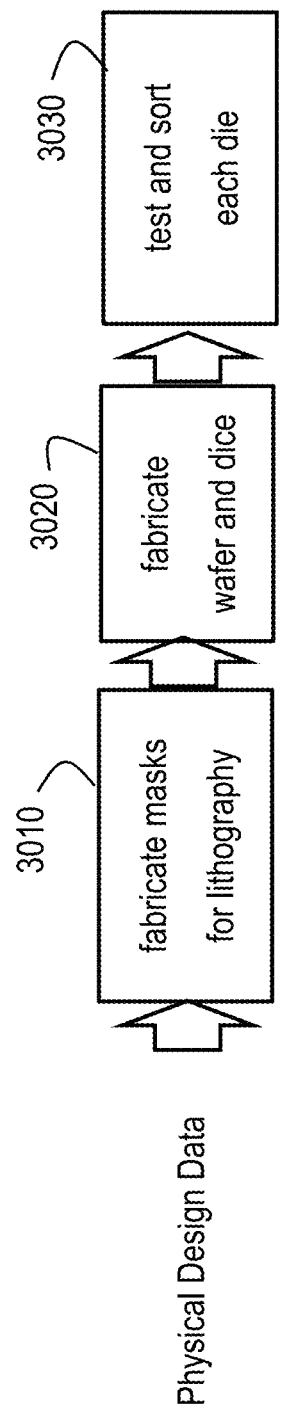
FIG. 10 shows further aspects of IC fabrication from physical design data.
Figure 11:
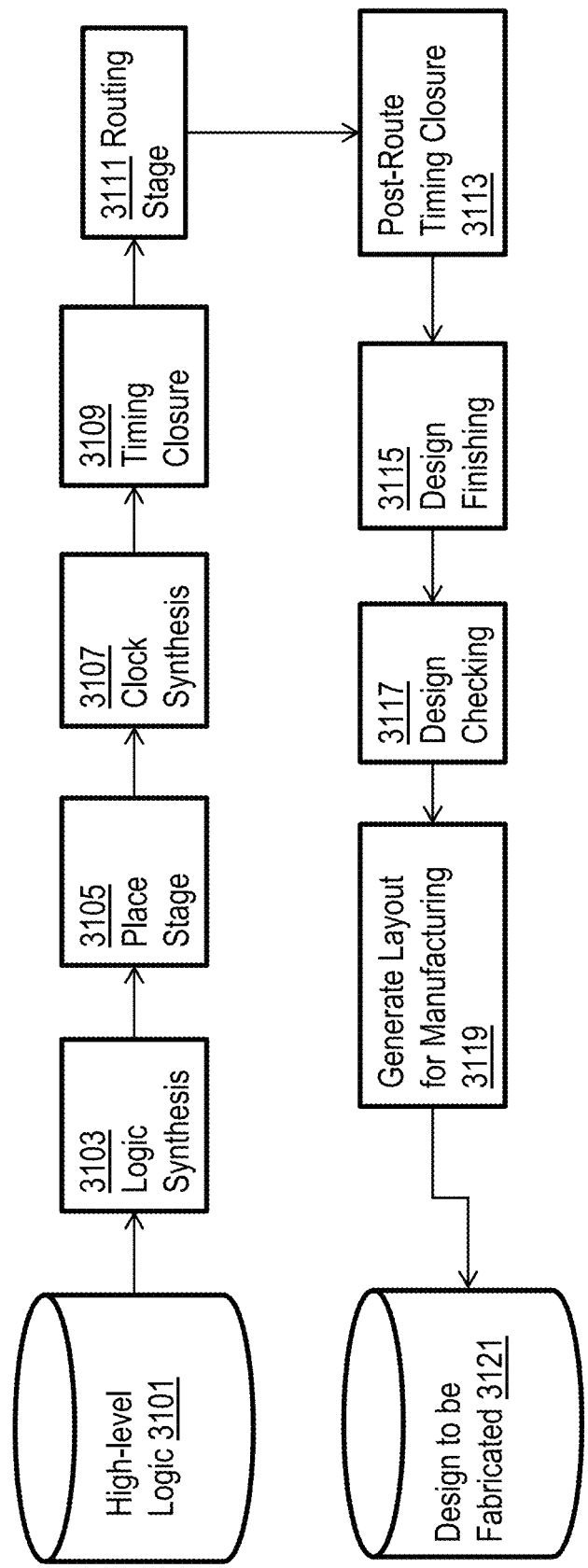
FIG. 11 shows an exemplary high-level Electronic Design Automation (EDA) tool flow, within which aspects of the invention can be employed.

Referring to FIGS. 9-11 discussed elsewhere herein, one or more embodiments further include fabricating a physical integrated circuit in accordance with the updated data structure. The updated data structure can, for example, be rendered in a design language as discussed elsewhere herein. Further steps can include preparing a layout based on the updated data structure rendered in the design language; and instantiating the layout as a design structure. The physical integrated circuit is fabricated in accordance with the design structure.

Accordingly, in one or more embodiments, the layout is instantiated as a design structure. See discussion of FIG. 9. A physical integrated circuit is then fabricated in accordance with the design structure. See again discussion of FIG. 9. Refer also to FIG. 10. Once the physical design data is obtained, based, in part, on the analytical processes described herein, an integrated circuit designed in accordance therewith can be fabricated according to known processes that are generally described with reference to FIG. 10. Generally, a wafer with multiple copies of the final design is fabricated and cut (i.e., diced) such that each die is one copy of the integrated circuit. At block 3010, the processes include fabricating masks for lithography based on the finalized physical layout. At block 3020, fabricating the wafer includes using the masks to perform photolithography and etching. Once the wafer is diced, testing and sorting each die is performed at 3030 to filter out any faulty die.

Figure 8:
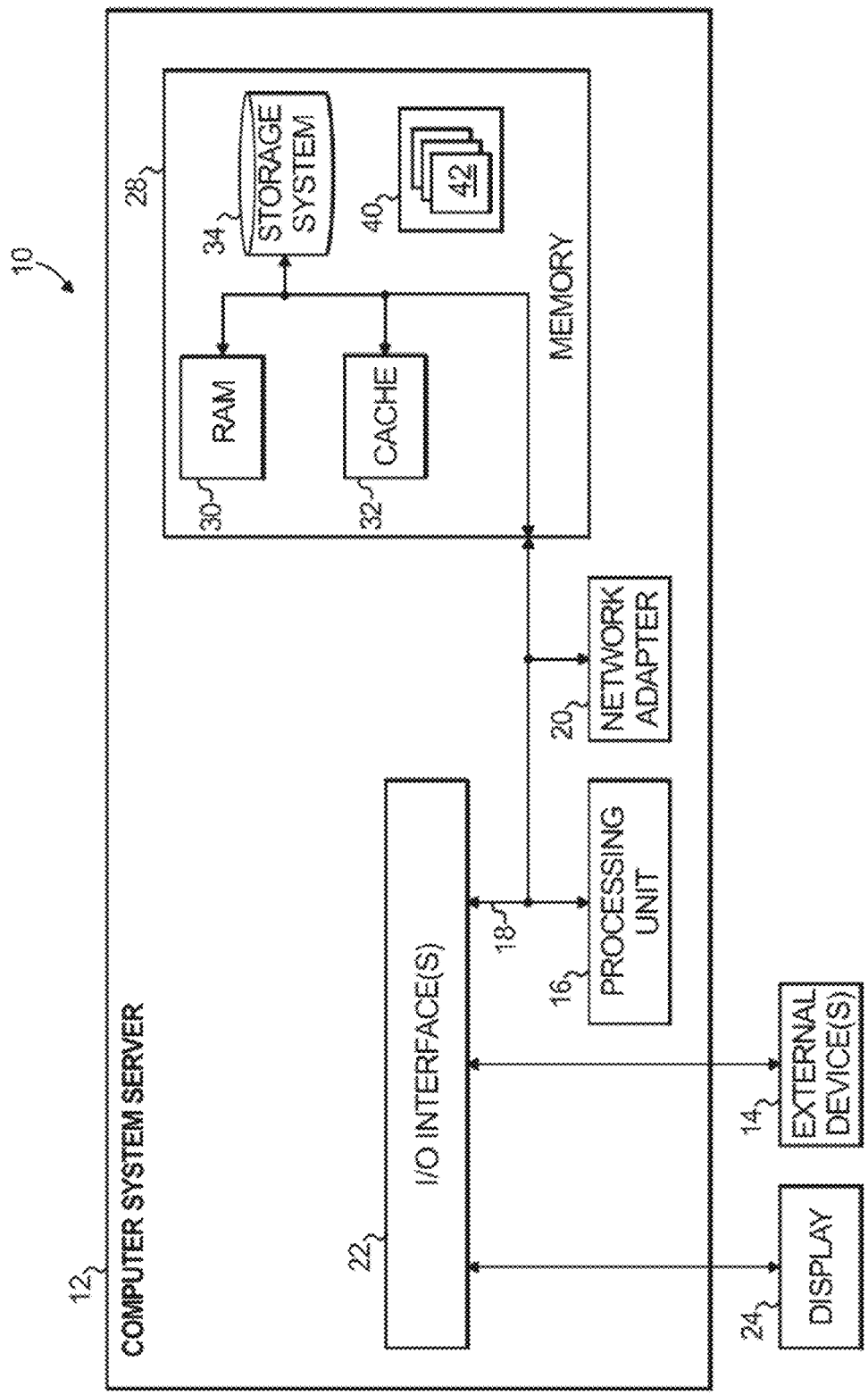
FIG. 8 depicts a computer system that may be useful in implementing one or more aspects and/or elements of the invention.

Referring to FIG. 8, one or more embodiments include a computer including a memory 28; and at least one processor 16, coupled to the memory, and operative to carry out or otherwise facilitate any one, some, or all of the method steps described herein. In one or more embodiments, the performance (speed) of this computer is improved, for example, by reducing iterations of across hierarchy design optimization leading to faster time-to-market for the chip; and/or disk usage is reduced.

Furthermore, referring to FIG. 9, in one or more embodiments the at least one processor is operative to generate a design structure for the circuit design in accordance with the analysis, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved (for example, because of enhanced accuracy as compared to the fixed assertion prior art approach).

FIG. 11 depicts an example high-level Electronic Design Automation (EDA) tool flow, which is responsible for creating an optimized microprocessor (or other IC (here standing for integrated circuit not in context)) design to be manufactured. A designer could start with a high-level logic description 3101 of the circuit (e.g. VHDL or Verilog). The logic synthesis tool 3103 compiles the logic, and optimizes it without any sense of its physical representation, and with estimated timing information. The placement tool 3105 takes the logical description and places each component, looking to minimize congestion in each area of the design. The clock synthesis tool 3107 optimizes the clock tree network by cloning/balancing/buffering the latches or registers. The timing closure step 3109 performs a number of optimizations on the design, including buffering, wire tuning, and circuit repowering; its goal is to produce a design which is routable, without timing violations, and without excess power consumption. The routing stage 3111 takes the placed/optimized design, and determines how to create wires to connect all of the components, without causing manufacturing violations. Post-route timing closure 3113 performs another set of optimizations to resolve any violations that are remaining after the routing. Design finishing 3115 then adds extra metal shapes to the netlist, to conform with manufacturing requirements. The checking steps 3117 analyze whether the design is violating any requirements such as manufacturing, timing, power, electromigration (e.g., using techniques disclosed herein) or noise. When the design is clean, the final step 3119 is to generate a layout for the design, representing all the shapes to be fabricated in the design to be fabricated 3121.

One or more embodiments of the invention, or elements thereof, can be implemented in the form of an apparatus including a memory and at least one processor that is coupled to the memory and operative to perform exemplary method steps. FIG. 8 depicts a computer system that may be useful in implementing one or more aspects and/or elements of the invention; it is referred to herein as a cloud computing node but is also representative of a server, general purpose-computer, etc. which may be provided in a cloud or locally.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Design Process Used in Semiconductor Design, Manufacture, and/or Test

One or more embodiments integrate the characterizing and simulating techniques herein with semiconductor integrated circuit design simulation, test, layout, and/or manufacture. In this regard, FIG. 9 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of design structures and/or devices, such as those that can be analyzed using techniques disclosed herein or the like. The design structures processed and/or generated by design flow 700 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 9 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a gate array or storage medium or the like, design structure 720 may be accessed and processed by one or more hardware and/or software modules within design process 710 to simulate or otherwise functionally represent an electronic component, circuit, electronic or logic module, apparatus, device, or system. As such, design structure 720 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of components, circuits, devices, or logic structures to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc. Improved latch tree synthesis can be performed as described herein.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 790 may comprise a compiled, executable HDL simulation model that functionally simulates the devices to be analyzed.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 790 may then proceed to a stage 795 where, for example, design structure 790: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for increasing the efficiency of electronic design automation, the method comprising:
   accessing a data structure comprising data characterizing a hierarchical integrated circuit design including a plurality of sub-blocks each with a plurality of ports;
   for each given one of said ports of each of said sub-blocks:
      obtaining a wire specification for a corresponding net connected to said given one of said ports in said design; and
      based on said wire specification, consulting a technology-specific lookup table to determine at least one of a corresponding default driving cell and default electrical model for an external wire coupling one of said default driving cell and an actual driving cell to said given one of said ports;
   optimizing each of said sub-blocks out-of-context based on said at least one of default driving cells and default electrical models;
   verifying in-context closure for said optimized sub-blocks; and
   responsive to said in-context closure, updating said data structure to reflect said optimized sub-blocks.

2. The method of claim 1, wherein, in said consulting step, both said corresponding default driving cell and said default electrical model are determined, and said default electrical model is for said external wire coupling said default driving cell to said given one of said ports.

3. The method of claim 2, wherein said optimizing includes applying said default driving cells and default electrical models in a clock-domain, edge, and mode-independent manner.

4. The method of claim 2, wherein said optimizing includes applying said default driving cells and default electrical models in a clock-domain, edge, and mode-dependent manner.

5. The method of claim 2, further comprising, for each given one of said ports of each of said sub-blocks:
   iteratively calculating a driving cell source slew that produces a desired port arrival time and slew at said given one of said ports;
   computing a delay through said driving cell and said external wire based on said iteratively calculated driving cell source slew; and
   computing an arrival time at an input of said driving cell by shifting said desired port arrival time by said computed delay.

6. The method of claim 5, further comprising repeating said iterative calculation for each clock-domain, mode, and edge.

7. The method of claim 2, wherein, in said accessing step, said sub-blocks are selected from the group consisting of cores, units, and macros.

8. The method of claim 2, wherein in said optimizing step, said sub-blocks are optimized out-of-context in parallel.

9. The method of claim 2, wherein said default electrical model for said external wire comprises a plurality of resistive-capacitive (RC) sub-segments.

10. The method of claim 9, further comprising accepting a user override for said default electrical model for a portion of said ports.

11. The method of claim 2, wherein, in said obtaining step, said wire specification comprises wire layer and wire code.

12. The method of claim 2, wherein, in said consulting step, said technology-specific lookup table includes a plurality of entries for a plurality of tabulated wire specifications, each of said entries including typical driver, typical wire length, typical capacitance per unit length, and typical resistance per unit length.

13. The method of claim 2, further comprising, for at least one of said ports of at least one of said sub-blocks:
   assuming a driving cell input slew;
   iteratively calculating a needed external wire length that produces a desired slew at said given one of said ports when said assumed driving cell input slew is asserted; and
   substituting said needed external wire length for said default electrical model for an external wire coupling.

14. The method of claim 2, further comprising, for at least one of said ports of at least one of said sub-blocks:
   assuming a driving cell input slew;
   iteratively calculating a needed external wire length that produces a desired slew at said given one of said ports when said assumed driving cell input slew is asserted;
   freezing wire length as said needed external wire length; and
   re-computing a statistical driving cell source slew that yields a statistical port slew.

15. The method of claim 2, further comprising fabricating a physical integrated circuit in accordance with said updated data structure.

16. The method of claim 15, wherein said updated data structure is rendered in a design language, further comprising:

preparing a layout based on said updated data structure rendered in said design language; and instantiating said layout as a design structure;

wherein said physical integrated circuit is fabricated in accordance with said design structure.

17. The method of claim 2, wherein said ports comprise input ports, and wherein said sub-blocks of said hierarchical integrated circuit design characterized in said data structure further include output ports, further comprising:

for each given one of said output ports of each of said sub-blocks:

obtaining a wire specification for a corresponding net connected to said given one of said output ports in said design; and based on said wire specification, consulting a technology-specific lookup table to determine at least one of a corresponding default load cell and default electrical model for an external wire coupling one of said default load cell and an actual load cell to said given one of said output ports;

wherein said optimizing of each of said sub-blocks out-of-context is further based on said at least one of default load cells and default electrical models for said external wire coupling one of said default load cell and an actual load cell to said given one of said output ports.

18. A computer comprising:

a memory; and at least one processor, coupled to said memory, and operative to increase the efficiency of electronic design automation by:

accessing a data structure comprising data characterizing a hierarchical integrated circuit design including a plurality of sub-blocks each with a plurality of ports;

for each given one of said ports of each of said sub-blocks:

obtaining a wire specification for a corresponding net connected to said given one of said ports in said design; and based on said wire specification, consulting a technology-specific lookup table to determine at least one of a corresponding default driving cell and default electrical model for an external wire coupling one of said default driving cell and an actual driving cell to said given one of said ports;

optimizing each of said sub-blocks out-of-context based on said at least one of default driving cells and default electrical models;

verifying in-context closure for said optimized sub-blocks; and responsive to said in-context closure, updating said data structure to reflect said optimized sub-blocks.

19. The computer of claim 18, wherein said updated data structure is rendered in a design language, and wherein said at least one processor is further operative to increase the efficiency of the electronic design automation by:

preparing a layout based on said updated data structure rendered in said design language;

instantiating said layout as a design structure; and fabricating a physical integrated circuit in accordance with said design structure.

20. A non-transitory computer readable medium comprising computer executable instructions which when executed by a computer performing electronic design automation cause the computer to perform a method which increases the efficiency of the electronic design automation, the method comprising:

accessing a data structure comprising data characterizing a hierarchical integrated circuit design including a plurality of sub-blocks each with a plurality of ports;

for each given one of said ports of each of said sub-blocks:

obtaining a wire specification for a corresponding net connected to said given one of said ports in said design; and based on said wire specification, consulting a technology-specific lookup table to determine at least one of a corresponding default driving cell and default electrical model for an external wire coupling one of said default driving cell and an actual driving cell to said given one of said ports;

optimizing each of said sub-blocks out-of-context based on said at least one of default driving cells and default electrical models;

verifying in-context closure for said optimized sub-blocks; and responsive to said in-context closure, updating said data structure to reflect said optimized sub-blocks.

\* \* \* \* \*